United States Patent Office 3,449,472
Patented June 10, 1969

3,449,472
CONTINUOUS EQUILIBRIUM PROCESS FOR PREPARING BIPHASE PLASTICS
Harry W. Coover, Jr., and Donald J. Shields, Kingsport, Tenn., assignors to Eastman Kodak Company, Rochester, N.Y., a corporation of New Jersey
No Drawing. Continuation of application Ser. No. 328,063, Dec. 4, 1963. This application Oct. 21, 1966, Ser. No. 588,626
Int. Cl. C08f *15/40*
U.S. Cl. 260—880          5 Claims

ABSTRACT OF THE DISCLOSURE

A continuous process for preparing biphase product in an aqueous system comprising continuously feeding a reaction system comprising a suspension of polybutadiene, a polymerization catalyst, and an addition polymerizable monomer combination comprising acrylonitrile and at least one compound chosen from the group consisting of styrene and α-methyl styrene into reactor means, reacting the components until a condition is attained wherein the monomer concentration is between about 0.5 and about 2.0% by weight of the total reaction system and the biphase product concentration is between about 12.5 and about 19.0% by weight of the total reaction system, and continuously withdrawing said product from said reactor means.

---

This application is a continuation of Ser. No. 328,063 filed on Dec. 4, 1963.

This invention relates to a continuous process for producing useful polymeric products from chemically unsaturated materials, and particularly concerns the preparation of biphase polymers having a significantly improved overall balance of properties.

Generally speaking, biphase plastics contain two separate phases—rubber and resin. The rubber functions to absorb shock energy and thereby improves the toughness of the continuous or resin phase. It has been found that the degree of interaction of the continuous phase with the dispersed rubber is quite important to the development of toughness. For example, should excessive interaction occur the shock-absorbing capacity of the rubber is diminished, and if too little interaction occurs the shock wave is not transmitted to the rubber by the continuous phase. Though some commercial biphase plastics probably do contain some interacted rubber and resin in the form of a graft copolymer the criteria for obtaining just the right amount of grafting for realizing maximum toughness, processability, proper hardness and rigidity for such applications as structural parts for automobiles, appliances, and the like which are subjected to considerable physical shock has not heretofore been propounded or exploited.

Heretofore, biphase plastics comprising distinct rubber and resin phases have been prepared by milling, kneading, or the like the rubber and resin or by coprecipitating a blend of rubber and resin emulsions. However, as indicated above, the most desirable degree of interaction of these phases is not obtainable by these methods, particularly with regard to expectancy and consistency of results.

Objects of the present invention, therefore are: to provide biphase plastics exhibiting a highly desirable balance of properties such as processability in low temperature, short-cycle molding operations, toughness, hardness, rigidity, and the like; and to provide a highly effective and versatile process for preparing such plastics in a consistent manner.

These and other objects have been achieved through the discovery that when the suspended rubber, monomer, catalyst, and other polymerization components such as activators, surfactants, and pH controllers are fed continuously to a reactor maintained under polymerization conditions, a concentration equilibrium will become established after a regulatable period between the unreacted monomer and biphase product. When the component feed rates to the reactor are such that the monomer concentration in the reactor and gross product is maintained within a certain low-level range the degree of graft of the continuous-phase resin onto the rubber reaches an optimum level and is controllable.

The cause of the superiority of the present continuous process eludes precise definition, but it is a fact that whereas in the batch process the concentrations of the reactants and biphase product continuously change throughout the entire reaction period, in the present continuous process the concentrations of these components are maintained essentially constant at equilibrium. With this in mind, one may readily appreciate that with such control as in the present process, the particular relationship between these component concentrations which effects the most desirable results may be exploited to give the best product in a continuous and substantially unchanging manner.

In the preferred embodiment of the invention, the monomer is present in the reaction medium and gross product at equilibrium in a concentration of from about 0.5 to about 2.0% by weight, and biphase product which apparently includes ungrafted continuous phase resin, ungrafted rubber, and continuous phase resin grafted onto latex is present in the reaction medium and gross product at equilibrium in a concentration of from about 12.5 to about 19.0% by weight. Substantial variations of the component concentration ranges may be employed depending upon the desired characteristics of the final biphase product.

Among the many rubbers useful in the present invention are polybutadiene, polyisoprene, and copolymers of butadiene or isoprene with styrene, acrylonitrile, α-methyl styrene, methacrylonitrile, and the like. The suspensions of these materials are conveniently prepared by polymerizing or copolymerizing the monomers in the presence of suitable surfactants and peroxidic catalyst. Butyl rubber suspension prepared by dispersing preformed butyl rubber in water by appropriate surfactants, and various ethylene-propylene copolymer rubbers in suspension form may also be used.

The term suspension as used herein refers to suspensoid sols containing rubbery particles of from about 0.015 to about 0.500 micron average diameter dispersed by polar molecules adsorbed thereon at their hydrophobic ends. Such molecules known as surfactants or emulsifiers in the polymer art are very numerous and may be represented by sodium stearate, Igepal CO–850 [Nonylphenoxypoly-(ethyleneoxy)ethanol], and Aerosol OT (dioctyl ester of sodium sulfosuccinic acid). For an extensive list of emulsifiers see Detergents & Emulsifiers, 1962, John W. McCutcheon, Inc., 236 Mt. Kemble Ave., Morristown, N.J. The term suspension as used herein also refers to particulate rubbery polymers dispersed by other means including: non-ionic surfactants, e.g., the reaction product of stearyl alcohol and excess ethylene oxide; the natural tendency of the fine particulate polymers to remain suspended for a practical period of time; and agitation of a mixture of the particulate polymer in liquid. In this regard, it may be generally stated that the manner in which the suspension is formed and maintained is not critical to the present invention since it is the disperse condition of the rubbery particles which is important and not the method of getting them in such condition.

Similarly, the particle size does not limit the broad utility of the invention and mainly affects the characteristics of the final biphase product. However, particles of above an average diameter of about 10 microns are not desirable since there will be fewer particles for a given amount of rubber, thus providing more opportunity for a growing crack to bypass the shock-absorbing rubber phase. The preferred materials are suspensions in water of particulate rubbery polymers having an average particle diameter in the range of from about 0.1 to about 2.0 microns, with smaller particles either losing their identity (discreteness) as rubber particles or being too small to absorb the energy of destructive propagating shock waves.

The effects of each of the above latices on the properties of the biphase product will of course vary in degree. However, the present process can achieve optimum properties in all cases through judicious exploitation of the component concentrations. For the same reasons, the monomer or monomers for the continuous phase resin may be selected from a wide variety of polymerizable materials having either of the following types of unsaturation:

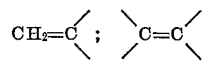

and

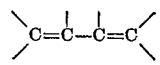

Such materials are comprehensively listed in U.S. Patent 2,396,785. The preferred monomers, however, are those selected from the group consisting of styrene, acrylonitrile, α-methyl styrene, methacrylonitrile and methyl methacrylate.

These monomers may be homo- or copolymerized to provide the continuous phase and the catalysts suitable for such polymerizations are many and varied. Suitable free radical catalysts include the inorganic peroxygen type represented by hydrogen peroxide and sodium persulfate, the organic peroxygen type represented by benzoyl peroxide, the azo type represented by α,α'-azobisisobutyronitrile, and the redox type represented by the lauroyl peroxide-triphenylamine and the persulfate-bisulfite systems. A particularly effective catalyst system comprises hydrogen peroxide activated by thioglycolic acid and appears in the example below.

The following example illustrates the preparation of a particularly good product according to the present process.

Example 1

Four separate feed systems designated 1–4 are maintained by continuously feeding components in any suitable manner to four reservoirs according to the following schedule:

| System No. | Component | Approximate feed rate (lbs./hr.) |
|---|---|---|
| 1 | H₂O | 11,085.0 |
|   | Polybutadiene | 400.0 |
|   | Igepal CO-850 | 21.1 |
| 2 | Styrene | 1,264.0 |
|   | Acrylonitrile | 422.0 |
|   | Aerosol OT | 6.32 |
| 3 | Thioglycolic acid | 31.0 |
|   | H₂O | 3,120.0 |
| 4 | H₃PO₄ | 1.7 |
|   | H₂O₂ | 16.9 |
|   | H₂O | 348.0 |

The components of each system are thoroughly blended in the reservoirs and the systems are continuously fed to a first agitated reactor of 4000 gal. capacity maintained at 60° C. This reactor is connected to a second agitated reactor of 4000 gal. capacity also maintained at 60° C. The feed rates of these systems are approximately as follows:

| System No. | Approximate rate ratio | Approximate feed rate (lbs./hr.) |
|---|---|---|
| 1 | 31.4 | 11,506.0 |
| 2 | 4.6 | 1,692.3 |
| 3 | 8.57 | 3,151.0 |
| 4 | 1.0 | 366.6 |

After running for a period of from 12–18 hours to establish the proper equilibrium, the suspension product is collected continuously and the polymer stabilized with 1±0.8% by wt. based on total product solids of a 2/1, phenolic/phosphite mixture. The suspension is then coagulated at about 70° C. with an acidified solution of saturated sodium chloride containing about 0.064% by weight of ethylenediaminetetra(acetic acid), washed four times with hot demineralized water and dried in a rotating vacuum dryer. The polymeric product has an excellent and highly stable white appearance and when molded under standard molding conditions, has the following physical properties:

| | |
|---|---|
| Heat dist. temp. (264 p.s.i.) ° F | 160 |
| Rockwell (R) hardness | 102 |
| Izod impact (73° C.) ft. lb. of notch | 6.0 |
| Izod impact (−40° C.) ft. lb. of notch | 1.8 |
| Tensile, p.s.i. (at fracture) | 5000 |
| Tensile, p.s.i. (yield) | 6000 |
| Elongation, percent | 25 |
| Modulus (p.s.i.×10⁵) (Flex.) | 2.1 |
| Torque (Brabender) | 1450 |
| Melt flow | 3.0 |

The product of Example 1 is an exceptionally versatile and commercially useful one. It is to be understood, however, that minor changes in rubber content, styrene/acrylonitrile ratio and thioglycolic acid concentration (which affects polymer I.V.) can be made as desired. The preferred recipe for this product employs a styrene/acrylonitrile weight ratio of from 7/3 to 8/2 and a polybutadiene solids concentration of from 15–25% by weight based on the total weight of the biphase product. It is noted that useful polymer recipes may employ from about 10 to about 30% by weight of polybutadiene and a styrene/acrylonitrile weight ratio of from about 6.5/3.5 to about 9/1. The polybutadiene preferably has a Mooney viscosity of 65–9 MS-4 and an average suspended particle diameter of 0.3–1.0 microns. Also, for best results with this preferred recipe, the Aerosol OT and Igepal CO–850 surfactants are preferred as is the hydrogen peroxide-thioglycolic acid catalyst system, and the pH is preferably maintained between 3 and 5. The temperature of the reaction zone is maintained at between about 50 and 70° C. although higher and especially lower temperatures are useful. The above feed rates may be varied to regulate the contact or residence time of the reaction system in the reaction zone. A contact time of between about 1.5 and 4.5 hours suffices for most polymerizations. It is noted that with respect to the general utility of the process the choice of reaction zone temperatures will vary according to the particular catalyst system employed. A water-to-solids weight ratio in the reaction system of about 7/1 is preferred but not critical.

Within the above concentration limits for the preferred recipe, when the polybutadiene content is raised the hardness goes down while the Izod impact goes up. When the thioglycolic acid concentration is raised, the styrene/acrylonitrile backbone I.V. goes down, the Izod impact goes down, the flow rate goes up and the Brabender plastograph torque goes down. When the ratio of acrylonitrile to styrene is increased, backbone I.V. goes up slightly, Izod impact goes up, flow goes down, Rockwell hardness goes up slightly, tensile strength goes up and modulus goes up.

In order to clearly demonstrate the superiority of the present continuous process over the prior-art batch type process, comparative continuous and batch runs were made, using the same recipe, reaction temperature and reaction time. The common recipe consisted of approximately the following:

| Reagents | Parts by weight | Approximate percent by weight |
|---|---|---|
| Polybutadiene | 20 | 2.5 |
| Styrene | 60 | 7.5 |
| Acrylonitrile | 20 | 2.5 |
| Thioglycolic acid | 0.2 | 0.025 |
| Aerosol OT | 3.0 | 0.372 |
| Igepal CO-850 | 1.0 | 0.125 |
| Phosphoric acid | 0.08 | 0.1 |
| Hydrogen peroxide | 0.8 | 0.1 |
| Water | 700 | 86.0 |

Example 2 (batch process)

The water and phosphoric acid were placed in a batch reactor and bubbled with nitrogen for 5 minutes. Igepal CO–850, polybutadiene, and a styrene and acrylonitrile mixture containing Aerosol OT dissolved therein were added to the reactor with agitation under a blanket of nitrogen. The reactor temperature was raised to 60° C. and the hydrogen peroxide was added, followed immediately by the thioglycolic acid. The reactor was sealed and the reactants stirred under nitrogen for three hours. The product, after stabilization with 1% of a phenolic-phosphite stabilizer, was coagulated with acidified salt and isolated by filtration. After washing, the product was dried, rolled, pelletized and injection molded into test specimens under standard conditions. It had a Rockwell hardness of 100, a melt flow rating of 0.4, and a notched Izod value at 73° F. of 1.3.

Example 3 (continuous process)

The reagents were separated in separate feed reservoirs as follows:

Feed No. 1: Water, polybutadiene, and Igepal CO–850;
Feed No. 2: Styrene, acrylonitrile, and Aerosol OT;
Feed No. 3: Thioglycolic acid and water;
Feed No. 4: Phosphoric acid, hydrogen peroxide and water.

These feeds (1–4) were fed simultaneously into a one-stage continuous reactor at respective rate ratios of approximately 31.4, 4.6, 8.57, and 1. Reactor capacity and total feed rate were such that the contact time was approximately 3 hours. The reactor temperature was held at 60° C. After equilibrium was reached, 12–18 hr. or between 4 and 6 contact times, the material was collected continuously and the polymer stabilized with 1% (based on product solids) of a 2/1 Naugawhite/Polygard mixture. The suspension was coagulated at 70° C. with an acidified solution of saturated NaCl containing ethylene-diamine tetra (acetic acid), and the biphase product was dried in a rotating vacuum dryer after four washes with hot demineralized water. This product after molding under standard conditions had a Rockwell hardness of 100, a melt flow rating of 3.0 and a notched Izod impact value at 73° F. of 6.5. High notched Izod values and high melt flow values are desirable.

The following examples, wherein the reactant proportions are varied, further illustrate the invention.

| Example | Polybutadiene, parts by weight | Styrene, parts by weight | Acrylonitrile, parts by weight | Melt flow | Hardness | Izod |
|---|---|---|---|---|---|---|
| 4 | 20 | 60 | 20 | 3.0 | 100 | 6.5 |
| 5 | 23 | 57.7 | 19.3 | 1.3 | 88 | 7.3 |
| 6 | 18.4 | 61.3 | 20.3 | 3.6 | 103 | 4.0 |
| 7 | 20 | 56 | 24 | 1.88 | 102 | 6.7 |
| 8 | 20 | 64 | 16 | 3.3 | 99 | 4.5 |

While the examples of continuous operation employ four separate feed systems, such is for convenience and the components may be separately fed. Moreover, although the most desirable balance of biphase plastic physical properties is obtained when a substantial portion (usually above about 85%) of the product is made in a one-stage equilibrium reactor, reactors of any size, shape and number may be adapted to the present continuous process by one skilled in the art.

The invention has been described in detail with particular reference to preferred embodiments thereof but it will be understood that variations and modifications can be effected within the spirit and scope of the invention as described hereinabove and as defined in the appended claims.

We claim:
1. A continuous process for preparing biphase product in an aqueous system comprising continuously feeding a reaction system comprising a suspension of polybutadiene, a polymerization catalyst, and an addition polymerizable monomer combination comprising acrylonitrile and at least one compound chosen from the group consisting of styrene and α-methyl styrene into reactor means, reacting the components until a condition is attained wherein the monomer concentration is between about 0.5 and about 2.0% by weight of the total reaction system and the biphase product concentration is between about 12.5 and about 19.0% by weight of the total reaction system, and continuously withdrawing said product from said reactor means.

2. The process of claim 1 wherein the monomer combination is acrylonitrile and styrene.

3. The process of claim 2 wherein the monomer system has a weight ratio of acrylonitrile to styrene of from about 3.5/6.5 to about 1/9 and wherein the polybutadiene solids concentration is from about 10 to about 30% by weight based on the total weight of the biphase product.

4. The process of claim 3 wherein the polymerization catalyst comprises hydrogen peroxide and thioglycolic acid.

5. The process of claim 4 wherein the polybutadiene is suspended in water with nonylphenoxy-poly(ethyleneoxy) ethanol and the acrylonitrile contains the dissolved dioctyl ester of sodium sulfosuccinic acid.

References Cited

UNITED STATES PATENTS

| | | | |
|---|---|---|---|
| 3,168,593 | 2/1965 | Fremon et al. | 260—880 |
| 3,268,625 | 8/1966 | Jones et al. | 260—880 |
| 3,337,650 | 8/1967 | Marcil | 260—880 |

SAMUEL H. BLECH, *Primary Examiner.*

M. J. TULLY, *Assistant Examiner.*

U.S. Cl. X.R.

260—878, 879